US011142458B2

(12) United States Patent
Cai et al.

(10) Patent No.: US 11,142,458 B2
(45) Date of Patent: Oct. 12, 2021

(54) LIGNIN-BASED CARBON FOAMS AND COMPOSITES AND RELATED METHODS

(71) Applicant: United States of America as Represented by the Secretary of Agriculture, Washington, DC (US)

(72) Inventors: Zhiyong Cai, Madison, WI (US); Qiangu Yan, Starkville, MS (US); Jinghao Li, Madison, WI (US)

(\*) Notice: Subject to any disclaimer, the term of this patent is extended or adjusted under 35 U.S.C. 154(b) by 427 days.

(21) Appl. No.: 15/896,265

(22) Filed: Feb. 14, 2018

(65) Prior Publication Data

US 2019/0248656 A1   Aug. 15, 2019

(51) Int. Cl.
*C01B 32/184* (2017.01)
*C08L 97/02* (2006.01)
*C01B 32/00* (2017.01)

(52) U.S. Cl.
CPC ............ *C01B 32/184* (2017.08); *C01B 32/00* (2017.08); *C08L 97/02* (2013.01); *C01B 2204/04* (2013.01); *C01B 2204/26* (2013.01); *C01P 2004/03* (2013.01)

(58) Field of Classification Search
CPC ... C01B 32/00; C01B 32/184; C01B 2204/03; C01B 2204/04; C01B 2204/26
See application file for complete search history.

(56) References Cited

U.S. PATENT DOCUMENTS

| | | |
|---|---|---|
| 3,894,878 A | 7/1975 | Mansmann |
| 6,033,506 A | 3/2000 | Klett |
| 6,323,160 B1 | 11/2001 | Murdie |
| 6,544,491 B1 | 4/2003 | Stiller |
| 6,656,238 B1 | 12/2003 | Rogers |
| 6,689,336 B2 | 2/2004 | Kanno |
| 6,833,012 B2 | 12/2004 | Rogers |

(Continued)

FOREIGN PATENT DOCUMENTS

| | | |
|---|---|---|
| CA | 2940849 | 9/2015 |
| WO | WO2005016818 A1 | 2/2005 |

OTHER PUBLICATIONS

Office Action in Canadian Counterpart Application dated Mar. 5, 2019.

(Continued)

*Primary Examiner* — Richard M Rump

(57) ABSTRACT

A method of making a carbon foam comprises subjecting a precursor composition comprising an amount of at least partially decomposed lignin to a first pressure for a first time, optionally, while heating the precursor composition to a first temperature; heating the compressed precursor composition to a second temperature for a second period of time while subjecting the compressed precursor composition to a second pressure to further decompose the at least partially decomposed lignin and to generate pores within the compressed precursor composition, thereby providing a porous, decomposed precursor composition; and heating the porous, decomposed precursor composition to a third temperature for a third time to carbonize, and optionally, to graphitize, the porous, decomposed precursor composition to provide the carbon foam. Also provided are the carbon foams and composites made from the carbon foam.

20 Claims, 4 Drawing Sheets

(56) References Cited

U.S. PATENT DOCUMENTS

| | | | |
|---|---|---|---|
| 8,034,266 B2* | 10/2011 | Spradling | C04B 35/528 264/29.6 |
| 2016/0168272 A1 | 6/2016 | Retsina | |
| 2017/0002129 A1 | 1/2017 | Grunbauer | |
| 2017/0313826 A1 | 11/2017 | Jansen | |

OTHER PUBLICATIONS

Office Action in Canadian Counterpart Application dated Jul. 3, 2019.
Office Action in Canadian Counterpart Application dated Dec. 5, 2019.

* cited by examiner

LIGNIN-BASED CARBON FOAMS AND COMPOSITES AND RELATED METHODS

BACKGROUND

Carbon foam is a carbon structure containing open macropores (cells) which are interconnected through carbon walls. Carbon foams have several desirable properties, such as large geometric surface area, low density, high corrosion resistance to chemicals and fire, strong mechanical strength, ultra-high service temperatures, low coefficient of thermal expansion, hydrophobic surfaces, and high thermal and electrical conductivities. There are two categories of carbon foams, graphitic and non-graphitic. Graphitic carbon foams tend to have high thermal and electrical conductivity, but relative lower mechanical strength as compared to non-graphitic carbon foams. Non-graphitic carbon foams are generally higher in mechanical strength, can serve as thermal insulators, and cost far less to manufacture.

Several preparation processes have been developed for carbon foam production including blowing carbon precursors followed by carbonization, template carbonization of carbon precursors, compression of exfoliated graphite, and assembly of graphene nanosheets. Blowing of carbon precursors can be divided into two methods including pyrolysis under pressure and adding chemicals (blowing agents) to generate gases. In the pyrolysis technique, the decomposition gases from precursors (like pitches) are kept in a closed vessel, followed by a sudden release of the pressure. For example, a pitch may be heated up to its softening temperature ($T_s$) in an autoclave and kept for a certain time. The precursor pitch will decompose and release gases or volatile components during heating, resulting in a build-up of pressure of up to a few MPa pressure. After being kept under pressure at a high temperature, the product is cooled down to room temperature and then the pressure is released quickly. Template carbonization is a technique used to control the pore structure of the carbon foam and can create micropores, mesopores and macropores. Polyurethane (PU) foams are usually used as the template in this method. Currently, carbon foams are generally produced by blowing carbon precursors. This is a high cost method requiring high temperature/high pressure reactor systems and is limited in the scope of the size and properties of the carbon foam it can produce.

Various feedstocks have been used as the precursors for carbon foam production including various pitches, asphalts, foamed synthetic plastics, coals, and coal extracts. The properties of the carbon foams depend on both the raw material characteristics and the selected process conditions. For example, carbon foams from pitches show good thermal conductivity and low density but poor mechanical strength; coal-based foams have good mechanical strength and higher density, but lower thermal/electrical conductivity. Some carbon foams have been formed from ligninsulfonates and ligninsulfonate/polymer compositions. However, such carbon foams exhibited low density and very low mechanical strength.

SUMMARY

Provided are methods for making lignin-based carbon foams. Also provided are the carbon foams and composites made from the carbon foams.

In one aspect, methods for making carbon foams are provided. In embodiments, such a method comprises subjecting a precursor composition comprising an amount of at least partially decomposed lignin to a first pressure for a first time, optionally, while heating the precursor composition to a first temperature; heating the compressed precursor composition to a second temperature for a second period of time while subjecting the compressed precursor composition to a second pressure to further decompose the at least partially decomposed lignin and to generate pores within the compressed precursor composition, thereby providing a porous, decomposed precursor composition; and heating the porous, decomposed precursor composition to a third temperature for a third time to carbonize, and optionally, to graphitize, the porous, decomposed precursor composition to provide the carbon foam.

In another aspect, carbon foams are provided. In embodiments, such a carbon foam comprises a carbon matrix defining a plurality of pores distributed throughout the carbon foam, the carbon foam characterized by a compressive strength of at least about 45 MPa.

Other principal features and advantages of the present disclosure will become apparent to those skilled in the art upon review of the following drawings, the detailed description, and the appended claims.

BRIEF DESCRIPTION OF THE DRAWINGS

Illustrative embodiments of the present disclosure will hereafter be described with reference to the accompanying drawings.

DETAILED DESCRIPTION

Figure 1A:
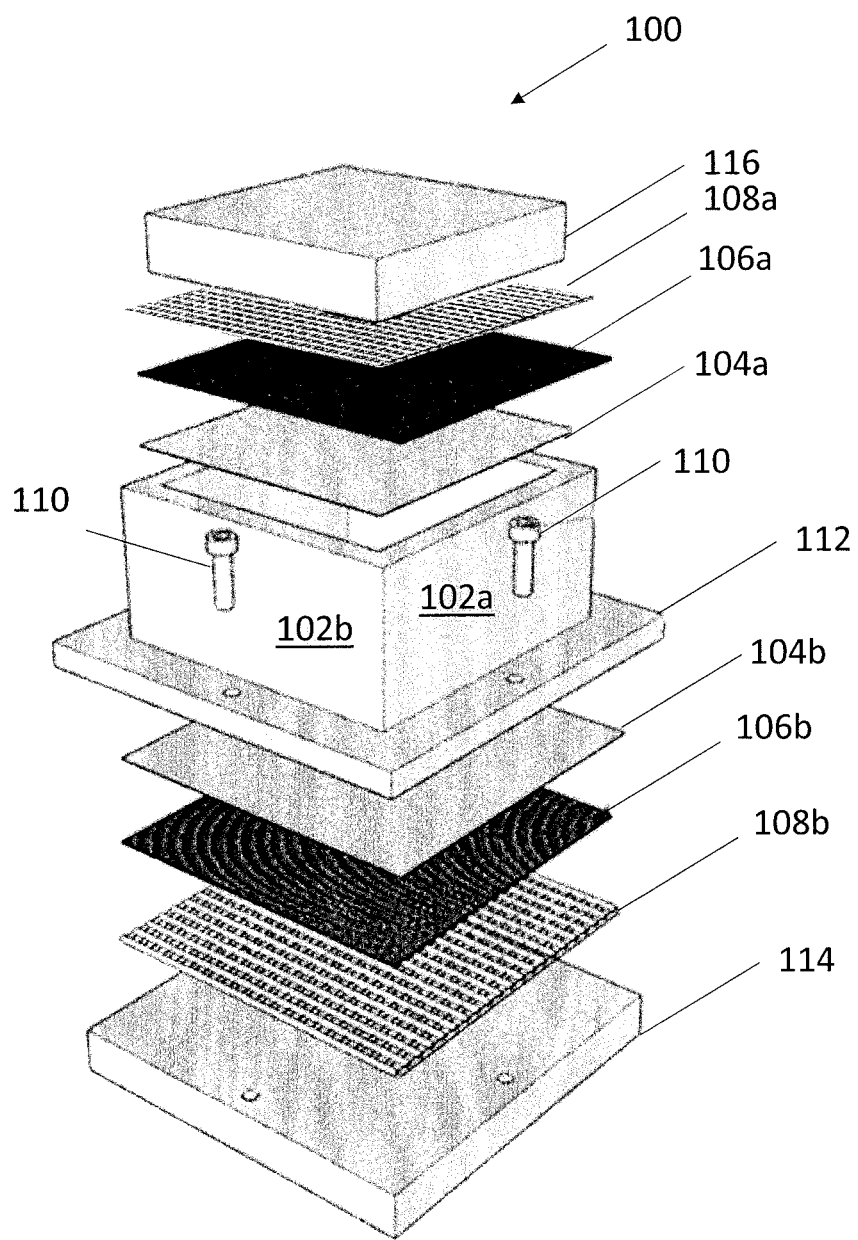
FIG. 1A shows an exploded, perspective view of an illustrative molding assembly which may be used to carry out embodiments of the present methods for making lignin-based carbon foams.

Provided are methods for making lignin-based carbon foams. Also provided are the carbon foams and composites made from the carbon foams.

The present methods are based on subjecting various lignin-containing precursor compositions to a series of steps involving the controlled application of pressure and heat in order to generate pores throughout the precursor compositions and then to carbonize/graphitize the precursor compositions. At least some embodiments of the present methods provide carbon foams which are characterized by a much more uniform distribution of pores throughout the carbon foam as compared to conventional carbon foams made using conventional processes. At least some embodiments of the present methods provide carbon foams which are characterized by much greater compressive strengths (e.g., 150 MPa, 200 MPa or even greater) as compared to conventional carbon foams. In addition, the present methods are capable of readily tuning the properties (e.g., density, porosity, compressive strength, thermal conductivity) of the carbon foams via adjustments to the precursor compositions and processing conditions. Finally, the present methods may be carried out under atmospheric pressure without requiring the use of expensive closed reactor systems.

Precursor Compositions

The precursor composition for use in the present methods comprises lignin and optionally, one or more additives.

Lignin is a complex natural biopolymer. Lignin is a cross-linked phenolic macromolecule lacking molecular order as the phenolic units are completely randomly arranged. Therefore, lignins are amorphous polymers. As an amorphous polymer, there are several important thermal transition zones: (1) glass-transition temperature ($T_g$), the temperature region where the polymer transitions from a hard, glassy material to a soft, rubbery material; (2) softening temperature ($T_s$), the temperature at which the polymer softens beyond some arbitrary softness value; and (3) decomposition temperature ($T_d$), the temperature when the polymer starts to chemically degrade. Thus, lignin does not melt during heating beyond $T_d$, but rather starts to decompose. Side chains in the lignin become unstable and begin to decompose and form char. Significant gaseous products are released during decomposing and charring, resulting in pores and channels being formed throughout the lignin char to provide a foam structure. At even higher temperatures, the foam structure may be converted to carbon/graphite via carbonization/graphitization.

There are a variety of different types of lignins, characterized by the biological source from which the lignin originates and/or the process used to extract the lignin from its biological source. These different types of lignins may have slightly different values of $T_g$, $T_s$, and $T_d$. By way of illustration, softwood lignins have a slightly higher $T_g$ as compared to hardwoods. Physically processed lignin from wood has the lowest $T_g$ (65-105° C.), and for chemically modified lignins, $T_g$ is reported to be higher: milled wood lignin has a $T_g$ of 110-160° C. and kraft lignin has a $T_g$ of 124-174° C. A raw kraft lignin sample softens at about 190° C. and decomposes/forms char within a wide temperature zone of from about 200° C. to about 650° C.

In the present disclosure, the term "lignin" encompasses lignin derived from different biological sources and/or different extraction processes. Thus, "lignin" includes, but is not limited to Kraft lignin (or sulfate lignin), lignosulfonates, milled wood lignin (MWL), organosolv lignin, alkali lignin (or soda lignin), hydrolytic lignin and Klason lignin. In embodiments, the lignin is Kraft lignin. The lignin may be provided in the form of a lignin-source such as wood, bamboo, rattan, grass, agricultural crop residues etc.

Kraft lignin is recovered from black liquor, which is the waste product from the kraft process. Therefore, in embodiments, black liquors from various recovery steps are used as the lignin-source in the present methods. The black liquors include raw black liquor without any treatment, concentrated black liquor, and purified black liquor. Lignosulfonates are recovered from the spent pulping liquids (red or brown liquor) from sulfite pulping. Red liquors may also be used as the lignin-source in the present methods.

The lignin in the precursor compositions may be raw lignin or at least partially decomposed lignin. The phrase "raw lignin" refers to lignin which has not been exposed to a temperature greater than about its $T_d$ and/or chemicals capable of facilitating the decomposition of the lignin. By way of illustration, the lignins described as Ingredients A1-A10 of the Examples below are considered to be raw lignins.

By contrast, the phrase "at least partially decomposed lignin" refers to lignin which has been exposed to a temperature greater than its $T_d$ and/or chemicals capable of facilitating the decomposition of the lignin. A variety of different processing techniques may be used to provide the at least partially decomposed lignin, including the processing described for Ingredients B1-B11 of the Examples below. Such at least partially decomposed lignin may be formed by heating raw lignin to an elevated temperature (e.g., from about 200° C. to about 500° C., from about 200° C. to about 400° C., or from about 200° C. to about 300° C.) and for a time (e.g., from about 0.5 to about 5 hours, from about 1 hour to about 4 hours, or about 3 hours) sufficient to at least partially decompose the raw lignin. Illustrative elevated temperatures, times and other conditions are described for Ingredients B1-B11, below.

The at least partially decomposed lignin may also include carbon-encapsulated metal (pure metal, metal oxide, metal carbide, etc.) nanoparticles, graphene-encapsulated metal (pure metal, metal oxide, metal carbide, etc.) nanoparticles, and/or graphene-based materials produced as described for Ingredients B12, C1-C2 and D1-D2 in the Examples below. The at least partially decomposed lignin may include any of the carbon-metal based precursors and the graphene-encapsulated metal nanoparticles described in U.S. patent application Ser. No. 15/862,039, which is hereby incorporated by reference in its entirety. Illustrative methods for forming these types of at least partially decomposed lignin are described for Ingredients B12, C1-C2 and D1-D2 in the Examples below and in U.S. patent application Ser. No. 15/862,039.

As noted above, the precursor composition may comprise one or more additives. These additives may include components selected to modify the properties (e.g., the mechanical strength, thermal conductivity, etc.) of the carbon foams formed from the precursor composition. These additives may be included in the precursor composition via the processing used to provide the at least partially decomposed lignin (e.g., from carbon-encapsulated metal nanoparticles) or they may be separately added. Illustrative additives include the following: carbon in a variety of forms (e.g., particles such as fibers, nanoparticles such as nanotubes); silica, metal, metal oxide, and metal carbide in a variety of forms (e.g., nanoparticles); and combinations thereof. The metal (either in elemental or compound form) may be a transition metal, e.g., iron (Fe); copper (Cu); nickel (Ni); cobalt (Co); molybdenum (Mo); tungsten (W); titanium; or combinations thereof.

The precursor composition may include various amounts of the lignin and, if present, the one or more additives. The amounts may be selected to tune the properties of the resulting carbon foam, including to achieve any of the values of the properties described below. In embodiments, the precursor composition includes at least about 50% by weight lignin as compared to the total weight of the precursor composition. This includes embodiments in which the precursor composition includes at least about 60% by weight, at least about 70% by weight, at least about 80% by weight, at least about 90% by weight, or about 100% by weight lignin as compared to the total weight of the precursor composition. In embodiments, the precursor composition includes one or more additives, the total amount of additives being present in an amount in the range of from about 0.1% to about 50% by weight as compared to the total weight of the precursor composition. This includes embodiments in which the precursor composition includes one or more additives present in an amount in the range of from about 1% to about 40% by weight, about 1% to about 35% by weight, about 3% to about 20% by weight, or from about 5% to about 15% by weight as compared to the total weight of the precursor composition.

As noted above, the lignin present in the precursor composition may be in the form of raw lignin or at least partially decomposed lignin. In embodiments, the lignin is raw lignin, i.e., the lignin of the precursor composition is in the form of raw lignin. In embodiments, the lignin is at least partially decomposed lignin, i.e., the lignin of the precursor composition is in the form of at least partially decomposed lignin. In embodiments, the precursor composition includes both raw lignin and at least partially decomposed lignin. The ratio of raw lignin to at least partially decomposed lignin may vary; again, the ratio may be selected to tune the properties of the resulting carbon foam. In embodiments, the ratio of raw lignin: at least partially decomposed lignin is in the range of from about 5:1 to about 1:5. This includes embodiments in which the ratio of raw lignin: at least partially decomposed lignin is in the range of from about 4:1 to about 1:4, from about 3:1 to about 1:3, from about 2:1 to about 1:2, from about 1.5:1 to about 1:1.5, or about 1:1.

The inventors have found that the use of at least partially decomposed lignin in the precursor composition can improve the uniformity of the distribution of pores throughout the resulting carbon foams. The term "uniformity" refers to both the physical distribution of pores throughout the material and the size of those pores. Such uniformity is related, at least in part, to the demonstrated high mechanical strength of at least some embodiments of the resulting carbon foams. By contrast, carbon foams formed only with raw lignin are generally characterized by non-uniform distribution of pores and much lower mechanical strengths.

Regarding the pores of the carbon foam, the pores may be irregularly shaped and in the form of elongated, tortuous channels. The size and the physical distribution of the pores may be evaluated using scanning electron microscopy (SEM) of cross-sections of the carbon foams (see, e.g., FIGS. 2A-2B). A uniform physical distribution of pores means that the average number of pores as measured from a representative number of SEM cross-sectional images of the carbon foam are approximately equal between the cross-sectional images (e.g., within ±20%, ±10%, ±5%, etc. of each other). Uniformly sized pores means that the average size of pores as measured from a representative number of SEM cross-sectional images of the carbon foam are approximately equal between the cross-sectional images (e.g., within ±20%, ±10%, ±5%, etc. of each other). The size of an irregularly sized pore may be taken as the largest edge-to-edge distance across the pore as measured from a SEM cross-sectional image.

In embodiments, the precursor composition is free of a polymer such as a polyethylene oxide polymer or an acrylic acid-acrylamide copolymer. By "free" it is meant that the amount of the polymer is zero or too small to have any material effect on the resulting carbon foam.

The precursor composition is generally in the form of a dry powder composed of a plurality of particles, e.g., having a size of from about 500 nm to about 1 mm. However, some moisture may be present, either in the form of water or another solvent used during processing.

Molding Assembly

The present methods may involve forming a carbon foam from any of the precursor compositions described using a molding assembly. The molding assembly includes a chamber configured to contain the precursor composition, including to contain the precursor composition as the composition expands as pores are generated throughout the composition during formation of the carbon foam. The shape and dimensions of the chamber are not limited, but rather depend upon the desired shape and dimensions of the carbon foam to be formed. Thus, a chamber configured to provide a flat sheet (or plate), a curved sheet (or plate), a block, a rod, a tube, a sphere, etc., may be used. The molding assembly may include a variety of other components to be used during the process of forming the carbon foam.

By way of illustration, a perspective, exploded view of an illustrative molding assembly 100 is shown in FIG. 1A. In this embodiment, the mold assembly 100 includes four side walls arranged to form the side surfaces of a rectangular chamber. (As noted above, the shape and dimensions of this chamber are not particularly limited.) Two side walls 102a and 102b are labeled. As further described below, the chamber may be filled with any of the disclosed precursor compositions. The four side walls may be formed of a variety of materials, such as aluminum, stainless steel, another metal or a ceramic.

Above the mold is a first upper layer 104a, a second upper layer 106a, and a third upper layer 108a. The first upper layer 104a forms a top surface of the rectangular chamber. Below the mold is a first lower layer 104b, a second lower layer 106b, and a third lower layer 108b. First lower layer 104b forms a bottom surface of the rectangular chamber. First upper and lower layers 104a,b may be composed of paper (e.g., paper towel) or a perforated metal foil (e.g., perforated aluminum foil). Second upper and lower layers 106a,b may be screens formed of a material such as aluminum, stainless steel, another metal or a ceramic. The thickness of the second upper and lower layers 106a,b may be in the range of from about 0.5 mm to about 2 mm and each may have an open area in the range of from about 20% to about 70%. The third upper and lower layers 108a,b may each be a screen. This screen may also be formed of a material such as aluminum, stainless steel, another metal, or a ceramic and may have a thickness in the range of from 0.5 mm to about 2 mm and an open area in the range of from about 20% to about 80%.

Bolts 110 may be used to secure a bottom frame 112 to a bottom plate 114 with the first through third lower layers 104b, 106b, 108b in between. The bottom frame 112 may also be formed of a material such as aluminum, stainless steel, another metal, or a ceramic. An upper block 116 is placed over the first, second, and third upper layers 104a, 106a, 108a. The upper block 116 may also be formed of a material such as aluminum, stainless steel, another metal, or a ceramic. Together, the upper block 116 and underlying first, second, and third upper layers 104a, 106a, 108a and the bottom plate 114 and overlying bottom frame 112 and first through third lower layers 104b, 106b, 108b serve to contain the precursor composition within the chamber during processing. Moreover, upper blocks having different weights may be used in order to provide a desired pressure on the underlying precursor composition during formation of the carbon foam. Alternatively, another mechanism may be used to apply the desired pressure to the upper block 116, and thus, to the underlying precursor composition.

The description above provides illustrative materials for the components of the molding assembly 100. However, the particular selection and combination of materials may depend, at least in part, on the desired transfer of heat to and from the precursor composition during heating. It is noted that materials for the first, second, and third upper layers 104a, 106a, 108a and the first through third lower layers 104b, 106b, 108b may vary. However, as described above, these layers are permeable in order to allow gases generated during the formation of the carbon foam to escape.

Figure 1B:
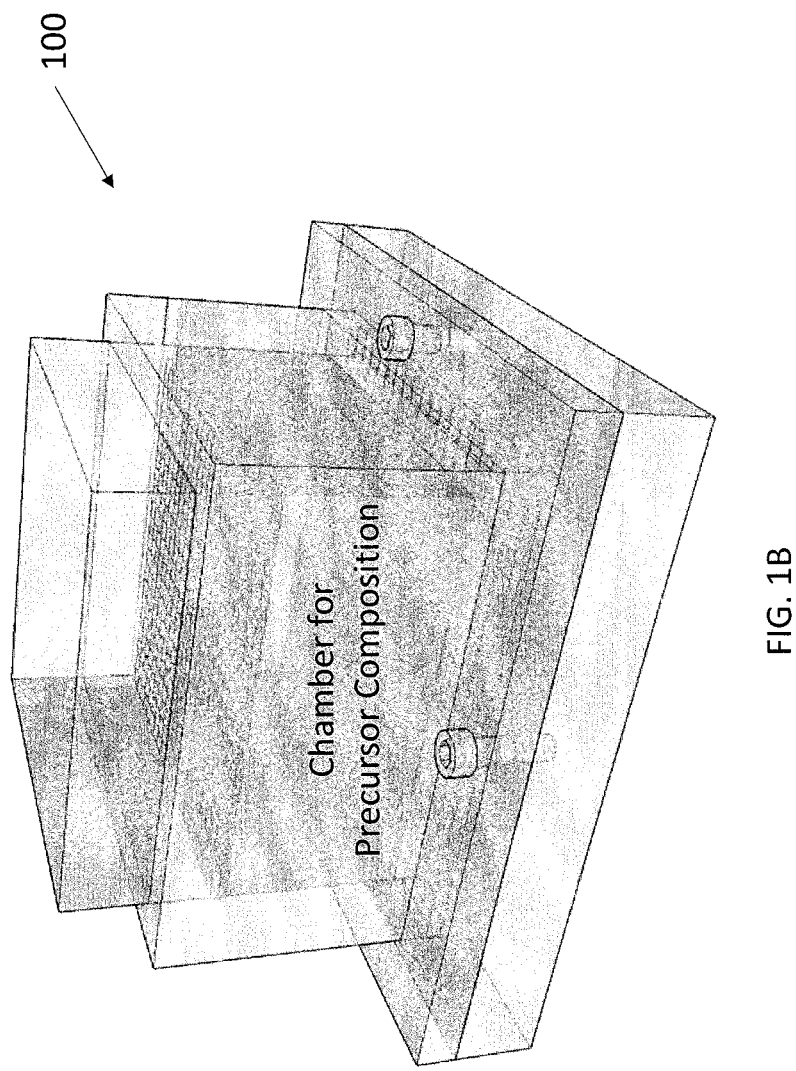
FIG. 1B shows an assembled, perspective view of the molding assembly of FIG. 1A.

An assembled view of the molding assembly 100 is shown in FIG. 1B.

Processing Conditions

An embodiment of a method of making a carbon based foam comprises filling a chamber of a molding assembly with any of the disclosed precursor compositions; subjecting the precursor composition to a first pressure for a first time, optionally, while heating the precursor composition to a first temperature; heating the compressed precursor composition to a second temperature for a second period of time while subjecting the compressed precursor composition to a second pressure to decompose the lignin and to generate pores within the compressed precursor composition, thereby providing a porous, decomposed precursor composition; and heating the porous, decomposed precursor composition to a third temperature for a third time to carbonize, and optionally, to graphitize, the porous, decomposed precursor composition to provide the carbon foam. The method may be carried out using the molding assembly 100 shown in FIG. 1A-1B and described above. In general, the various parameters (first and second pressures, first through third temperatures, etc.) may be selected to tune the properties of the resulting carbon foam, including to achieve any of the values of the properties described below.

The step of subjecting the precursor composition to the first pressure for the first time may be considered to be a cold press step. However, if heating to the first temperature is also used, this step may be considered to be a hot press step. The first pressure may be a pressure in the range of from greater than 0 MPa to about 50 MPa, from about 1 MPa to about 40 MPa, or from about 5 MPa to about 20 MPa. The first temperature may be a temperature of at least the $T_s$ of the lignin in the precursor composition. In embodiments, the first temperature is in the range of from about 150° C. to about 300° C., including from about 200° C. to about 300° C., or from about 250° C. to about 300° C. For a cold press step, the first time may be in the range of from about 5 sec to about 60 sec, from about 10 sec to about 50 sec, or from about 20 sec to about 40 sec. For a hot press step, the first time may be in the range of from about 5 min to about 30 min, from about 10 min to about 25 min or from about 15 min to about 20 min. The inventors have found that the use of a cold/hot press step can improve the uniformity of the distribution of pores throughout the resulting carbon foams as well as increase the mechanical strength of the resulting carbon foams. The cold/hot press step provides a compressed precursor composition.

Next, the compressed precursor composition is heated to the second temperature for the second period of time while subjecting the compressed precursor composition to the second pressure. This step may be considered to be a foam formation step. The second temperature may be a temperature of at least the $T_d$ of the lignin in the precursor composition. In embodiments, the second temperature is in the range of from about 450° C. to about 700° C., including from about 500° C. to about 650° C., or from about 550° C. to about 600° C. In embodiments, the second time is in the range of from about 30 min to about 60 min, from about 35 min to about 55 min or from about 40 min to about 50 min. In embodiments, the second pressure is in the range of from about 1 Pa to about 10,000 Pa, including from about 10 Pa to about 5,000 Pa, or from about 100 Pa to about 1,000 Pa. During this lignin decomposition and pore formation step, an inert gas may be flowed through the precursor composition. In such an embodiment, the method may be carried out "on the bench," i.e., under atmospheric pressure. Alternatively, the method may be carried out in a closed reactor system, e.g., the molding assembly may be enclosed in a closed vessel and pressurized with the inert gas. The foam formation step provides a porous, decomposed precursor composition.

Next, the porous, decomposed precursor composition is further heated to the third temperature for the third time. The third temperature is sufficiently high and the third temperature sufficiently long to carbonize or to carbonize and then graphitize the decomposed lignin. In embodiments, the third temperature is in the range of from about 750° C. to about 3000° C., including from about 750° C. to about 1100° C., or from about 1000° C. to about 3000° C. In embodiments, the third time is in the range of from about 1 hour to about 5 hours, from about 1 hour to about 4 hours, or about 3 hours.

Unless otherwise stated, "carbon" in "carbon foam" refers to both carbon and graphite, i.e., to both a precursor composition which has been carbonized and a precursor composition which has been carbonized and then graphitized. However, in embodiments, the two types of carbon foam can be distinguished as graphitic carbon foam and non-graphitic carbon foam.

Carbon Foam Properties

As described herein, the present methods are capable of tuning the properties (e.g., density, porosity, compressive strength, thermal conductivity) of the carbon foams via adjustments to the precursor compositions and processing conditions. The carbon foam themselves are also encompassed by the present disclosure. The carbon foams may be characterized by one or more of the following properties: apparent density, porosity, compressive strength and thermal conductivity at room temperature. These properties may be measured using the known standards described in the Examples, below.

In embodiments, the carbon foam is characterized by an apparent density of greater than about 0.5 g/cm$^3$, greater than about 1 g/cm$^3$, or greater than about 1.5 g/cm$^3$. This includes apparent densities in the range of from about 0.1 g/cm$^3$ to about 2.0 g/cm$^3$, from about 0.15 g/cm$^3$ to about 1.5 g/cm$^3$, or from about 0.5 g/cm$^3$ to about 1.0 g/cm$^3$.

In embodiments, the carbon foam is characterized by a porosity in the range of from about 30% to about 90%, including from about 40% to about 85%, or from about 50% to about 80%.

In embodiments, the carbon foam is characterized by a compressive strength of at least about 45 MPa, at least about 50 MPa, at least about 100 MPa, at least about 150 MPa, or at least about 200 MPa. This includes compressive strengths in the range of from about 10 MPa to about 200 MPa.

In embodiments, the carbon foam is characterized by a thermal conductivity at room temperature (20-25° C.) of greater than about 10 W/m/K, greater than about 25 W/m/K, or greater than about 50 W/m/K. This includes thermal conductivities at room temperature in the range of from about 0.05 W/m/K to about 100 W/m/K, from about 1 W/m/K to about 90 W/m/K, or from about 10 W/m/K to about 80 W/m/K.

The carbon foam may be characterized by various combinations of the property values described above.

Composites comprising any of the present carbon foams and another, different material in contact with the carbon foam are also provided.

The present carbon foams find use in a variety of applications. The carbon foams may be used as lightweight thermal barriers, wall panels, and as baffles for high intensity flames. The carbon foams may be used as electrode materials for energy storage devices such as lithium-ion rechargeable batteries and electrochemical capacitors. In these devices, carbon foams having high electrical and thermal conductivities will reduce the internal resistance of the devices and will enhance the heat dissipation from the devices. The carbon foams may be used as microwave reflection and electromagnetic interference materials due to their high electrical conductivity. The carbon foams may be used as monolithic supports for metallic catalysts, due to high diffusivity of reagent gases and low pressure drop per unit length.

EXAMPLES

Precursor compositions were formed from various combinations of ingredients A-D.

Ingredient A

Six types of lignin were used including kraft lignin, organosolv lignin, lignosulfonates, alkali lignin, hydrolytic lignin, and Klason lignin. Organosolv lignin, lignosulfonates, alkali lignin, hydrolytic lignin, and Klason lignin samples were purchased from Sigma-Aldrich, Inc. Kraft lignin was provided by Domtar. A proximate moisture analysis was carried out according to the ASTM D4442-07 standard. The moisture content of the raw lignins were 2.5% (organosolv lignin) 8.2% (lignosulfonates), 7.5% (alkali lignin), 7.0% (hydrolytic lignin), 6.2% (Klason lignin), and 30% (kraft lignin) (all by weight of the raw lignin material). These raw lignins were grounded to fine powders using a ball mill machine to provide particle sizes in the range of from 500 nm to 1 mm and labeled as ingredients A1 (kraft lignin), A2 (organosolv lignin), A3 (lignosulfonates), A4 (alkali lignin), A5 (hydrolytic lignin), and A6 (Klason lignin). Raw kraft lignin was grounded to fine powders, and subsequently dried naturally in air for 1 day, 2 days, 3 days, or 5 days. The dried, ground raw kraft lignin samples had a moisture contents of 12.5%, 8.6%, 4.7%, and 4.2% (all by weight of the dried, ground raw kraft lignin material). These were labelled as ingredients A7 (dried kraft lignin, 12.5%), A8 (dried kraft lignin, 8.6%), A9 (dried kraft lignin, 4.7%) and A10 (dried kraft lignin, 4.2%), respectively.

Black liquors containing kraft lignin were also used as ingredients. Three black liquors were provided by Domtar. The raw liquor was labeled as A11, the concentrated black liquor was labeled as A12, and the purified black liquor was labeled as A13. Ingredient A11 was vaporized and dried at 110° C. in an oven for 24 hours and was labeled as A14. Ingredient A12 was vaporized and dried at 110° C. in an oven for 24 hours and was labeled as A15. Ingredient A13 was vaporized and dried at 110° C. in an oven for 24 hours and was labeled as A16.

Ingredient B

Ingredient A1 (500 grams) was at least partially decomposed in a muffle furnace by exposing ingredient A1 to at 10 different temperatures (225° C., 250° C., 275° C., 300° C., 325° C., 350° C., 375° C., 400° C., 425° C., and 450° C.) under a nitrogen atmosphere for 3 hours. The temperature was raised from room temperature to the desired temperature using a heating rate of 10° C./min. The resulting lignin chars were ground to fine powders using a ball mill machine and labeled as ingredients B1-B10, respectively, i.e., B1 (A1 at 225° C.), B2 (A1 at 250° C.), B3 (A1 at 275° C.), B4 (A1 at 300° C.), B5 (A1 at 325° C.), B6 (A1 at 350° C.), B7 (A1 at 375° C.), B8 (A1 at 400° C.), B9 (A1 at 425° C.), B10 (A1 at 450° C.).

Next, southern pine wood chips (500 grams, ~1 mm in length) were at least partially decomposed in a muffle furnace at a temperature of between 250-450° C. under a nitrogen atmosphere for 1 hour. The resulting wood char was ground to a fine powder using a ball mill machine and labeled as ingredient B11 (wood char).

Next, 300 grams of kraft lignin (provided by Domtar) was first added to 300 mL tetrahydrofuran in a 2000 mL glass beaker and the lignin-tetrahydrofuran mixture was stirred for 2 hours. 246.0 grams of iron (III) nitrate nonahydrate was added to 100 mL deionized (DI) water in a 500 mL glass beaker and the iron nitrate-water mixture was stirred until iron nitrate is dissolved completely. The iron nitrate solution was added drop-like (~2 mL/min) to the lignin-tetrahydrofuran mixture. The final mixture was stirred for 2 hours, followed by keeping it at room temperature for 24 h and oven-drying it at 110° C. for 24 hours. The dried, iron-impregnated kraft lignin sample was then thermally treated using a muffle furnace. An inert carrier gas (either argon or nitrogen) was first introduced into the furnace at a flow rate of 80 mL/min for 30 minutes. The furnace was temperature-programmed with a heating rate of 2.5° C./min to reach 300° C. and kept at 300° C. for 2 hours. The furnace was turned off and the sample was allowed to cool to ambient temperature naturally. The cooled sample was loaded into a ball mill machine and ground at 1000 rpm for 30 minutes. Fifty grams (50 g) of this sample was then packed in the middle of a 2-inch OD ceramic tubular reactor. Either methane or natural gas was introduced into the reactor. The reactor was temperature-programmed with a heating rate of 10° C./min to reach 1000° C. and kept at 1000° C. for 1 hour. The furnace was cooled down at a rate of 10° C./min to room temperature. The resulting graphene-based materials formed according to this procedure were ground to a fine powder and labeled as ingredients B12 (iron-impregnated graphene-based material from kraft lignin).

Ingredient C 300 grams of ingredient A1 was first added to 300 mL tetrahydrofuran in a 2000 mL glass beaker and the lignin-tetrahydrofuran mixture was stirred for 2 hours. 246.0 grams of iron (III) nitrate nonahydrate was added to 100 mL DI water in a 500 mL glass beaker and the iron nitrate-water mixture was stirred until iron nitrate dissolved completely. The iron nitrate solution was added drop-like (~2 mL/min) to the lignin-tetrahydrofuran mixture. The final mixture was stirred for 2 hours, followed by keeping it at room temperature for 24 h and oven-drying it at 110° C. for one day. The dried sample was then transferred to a muffle furnace and an inert carrier gas (either argon or nitrogen) was first introduced into the furnace at a flow rate of 50-1000 mL/min for 30 minutes. The furnace was temperature-programmed with a heating rate of 1-5° C./min to reach 250-800° C. and kept at the final temperature for 1 hour. The furnace was turned off and samples allowed to cool to ambient temperature naturally. Then the cooled samples were loaded into a ball mill machine and ground at 1000 rpm for 30 minutes. The resulting fine powders formed according to this procedure were labeled as ingredients C1 (carbon-encapsulated iron nanoparticles from kraft lignin).

130.0 grams of cobalt (II) nitrate nonahydrate from Sigma-Aldrich was added to 100 mL DI water in a 500 mL glass beaker and the cobalt nitrate mixture was stirred until the solid dissolved completely. The cobalt nitrate solution was added drop-like (~2 mL/min) to 100 g wood char, bamboo, rattan, or wood chips, followed by stirring the mixture for 0.5 hours. Wood char was obtained from a typical fast pyrolysis process. Bamboo, rattan, or wood chips were dried in an oven at 105° C. overnight before use. The cobalt-biomass mixture was kept at room temperature for 24 h, and then oven-dried at 110° C. for one day. The dried sample was then transferred to a muffle furnace and an inert carrier gas (either argon or nitrogen) was first introduced into the furnace at a flow rate of 50-1000 mL/min for 30 minutes. The furnace was temperature-programmed with a heating rate of 1-5° C./min to reach 250-800° C. and kept at the final temperature for 1 hour. The furnace was turned off and the samples were allowed to cool to ambient temperature naturally. Then the cooled samples were loaded into a ball mill machine and ground at 1000 rpm for 30 minutes. The resulting fine powders formed according to this procedure were labeled as ingredients C2 (carbon-encapsulated cobalt nanoparticles from biomass).

Ingredient D 100 grams of ingredient A1 was first added to 100 mL tetrahydrofuran in a 2000 mL glass beaker, and the lignin-tetrahydrofuran mixture was stirred for 2 hours. 32.4 grams of ammonium metatungstate hydrate ($(NH_4)_6H_2W_{12}O_4 \cdot xH_2O$ from Sigma-Aldrich) was added to 100 mL DI water in a 500 mL glass beaker, and the solution was stirred for 30 minutes. The ammonium metatungstate solution was added drop-like (~2 mL/min) to the lignin-tetrahydrofuran solution. The final mixture was stirred for 2 hours, followed by keeping the mixture at room temperature for 24 h, and then oven-drying it at 110° C. for one day. The dried sample was then transferred to a muffle furnace and an inert carrier gas (either argon or nitrogen) was first introduced into the furnace at a flow rate of 50-1000 mL/min for 30 minutes. The furnace was temperature-programmed with a heating rate of 1-5° C./min to 250-800° C. and kept at the final temperature for 1 hour. The furnace was turned off and the samples were allowed to cool to ambient temperature naturally. Then the cooled samples were loaded into a ball mill machine and ground at 1000 rpm for 30 minutes. The resulting fine powders were labeled as ingredients D1 (carbon-encapsulated tungsten carbide nanoparticles from kraft lignin).

A solution consisting of anhydrous tetraethylorthotitanate, $Ti(OC_2H_5)_4$, and absolute ethanol was prepared by adding 10 g of $Ti(OC_2H_5)_4$ to 100 mL ethanol. The mixture was stirred until a clear solution was obtained. The solution was then added dropwise to 100 g of kraft lignin dissolved in 100 mL tetrahydrofuran while stirring. The final mixture was stirred for 2 hours, followed by keeping the mixture at room temperature for 24 h, and then oven-drying it at 110° C. for one day. The dried sample was then transferred to a muffle furnace and an inert carrier gas (either argon or nitrogen) was first introduced into the furnace at a flow rate of 50-1000 mL/min for 30 minutes. The furnace was temperature-programmed with a rate of 1-5° C./min to reach 250-800° C. and kept at the final temperature for 1 hour. The furnace was turned off and the samples were cooled to ambient temperature naturally. Then the cooled samples were loaded into a ball mill machine and ground at 1000 rpm for 30 minutes. The resulting fine powders were labeled as ingredients D2 (carbon-encapsulated titanium oxide nanoparticles from kraft lignin).

Characterization

The morphology and microstructure of the carbon foam samples prepared as described in the Examples below were analyzed by scanning electron microscopy (SEM), using a ZEISS instrument. Samples were coated with a gold-palladium alloy of 10-15 nm thickness using a sputter coater prior to SEM examination. Both the apparent ($D_a$) and true densities ($D_t$) of carbon foam were measured following standard methods ASTM D 1622 and ASTM D 792-08, respectively. The bulk porosity (P) of the carbon foam samples were calculated using the following equation:

$$P(\%) = 100 \times ((D_t - D_a)/(D_t)).$$

Experiments were also conducted according to ASTM standards to determine the mechanical properties the carbon foam samples. Compression strength was measured according to ASTM Standard C365/C365M-05. These tests were carried out at room temperature on an electron universal testing machine. Thermal conductivity was measured following ASTM Standard E1225 by a laser flash thermal analyzer at room temperature. The fire resistance of the carbon foam samples was measured following the standard method of ASTM E 1354.

Example 1

300 grams of A1-A10 were each ground using a ball mill machine for 5-30 minutes then deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization: The carbon foam in the molding assembly 100 was then cooled to room temperature at a rate of less than about 10° C./min. The treatment of Example 1 provided open celled expanded carbon foams. After removal from the molding assembly 100, the carbon foams may be sawed or otherwise shaped by machining to the desired dimension. Carbon foams formed according to Example 1 were characterized by apparent densities of between about 0.1 and about 0.3 g/cm$^3$, compressive strengths of between about 10 MPa and 20 MPa and thermal conductivities of between 0.05 W/m/K and 1.0 W/m/K at room temperature. All the carbon foams passed the fire resistance test.

Example 2

300 grams of B1-B11 were each ground using a ball mill machine for 10-30 minutes then deposited in the chamber of the molding assembly 100 of FIG. 1. The composition in the chamber was cold pressed using a pressure of between 0 and 50 MPa for a time of between 5-60 seconds. The composition was transferred in the chamber to a heating chamber and the upper block 116 was placed over the chamber as shown in FIG. 1. The upper block 116 was used to apply a pressure of from 1 to 10000 Pa on the composition. Nitrogen or argon gas was introduced into the heating chamber. The heating chamber was then heated at a heating rate of from about 0.1 to 10° C./min up to a temperature of about 450-700° C. and held for 30 to 60 minutes. After which, it is cooled slowly. The foam is removed from the mold. The foam was then further graphitized by introducing it into a furnace at a temperature of 1000-3000° C. under a non-oxidizing atmosphere at atmospheric pressure for one hour. After cooling, the now graphitized carbon foam is withdrawn from the furnace. The graphite foam sample is subsequently sawed or otherwise shaped by machining to the desired dimensions. Carbon foams formed according to Example 2 were characterized by apparent densities of between about 0.2 and about 1.5 g/cm³, compressive strengths of between about 30 MPa and 150 MPa and thermal conductivities of between 0.1 W/m/K and 100 W/m/K at room temperature. All the carbon foams passed the fire resistance test.

Example 3

Example 3 illustrates the effects of the ratio of ingredient A to ingredient B on the properties of carbon foams. Ingredient A10 (dried kraft lignin, moisture 4.2%) and ingredient B4 (kraft lignin, partially decomposed at 300° C.) were put into a ball mill machine and ground for 30 minutes. As shown in Table 1, various relative amounts of A10 and B4 were used, but in all cases the total amount was 300 grams. The compositions were each deposited in the chamber of the molding assembly 100 of FIG. 1. The compositions in the chamber were cold pressed using a pressure of between 0 and 50 MPa for a time of between 5-60 seconds. The compositions were then transferred in the chamber to a heating chamber and the upper block 116 was placed over the chamber as shown in FIG. 1. The upper block 116 was used to apply a pressure of from 1 to 10000 Pa on the compositions. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. Carbon foams in the molding assembly 100 were then cooled to room temperature at a rate of less than about 10° C./min. The treatment of Example 3 provides open celled expanded carbon foams. After removal from the molding assembly 100, the carbon foams may be sawed or otherwise shaped by machining to the desired dimension.

Table 1 shows the physical properties of the resulting carbon foams made according to Example 3, using different ratios of ingredients A:B. The results demonstrate that the apparent density increased as the proportion of ingredient B increased. The carbon foam having the lowest apparent density 0.15 g/cm³ was the carbon foam made from only ingredient A. Foam porosity decreased as the proportion of ingredient B increased. The compressive strength increased as the proportion ingredient B increased. The highest compressive strength of 43 MPa was achieved from the carbon foam made from only ingredient B.

TABLE 1

Physical properties of carbon foams prepared using different ratios of ingredients A and B.

| Ingredients (g) | | Apparent density (g/cm³) | Porosity (%) | Compressive strength (MPa) |
| --- | --- | --- | --- | --- |
| A10 | B4 | | | |
| 300 | 0 | 0.15 | 88.3 | 12.8 |
| 250 | 50 | 0.2 | 84.8 | 19.5 |
| 200 | 100 | 0.26 | 81.2 | 26.7 |
| 150 | 150 | 0.32 | 77.5 | 32.2 |
| 100 | 200 | 0.38 | 73.8 | 36.5 |
| 50 | 250 | 0.46 | 68.5 | 39.9 |
| 0 | 300 | 0.56 | 62.3 | 43.0 |

Figure 2A:
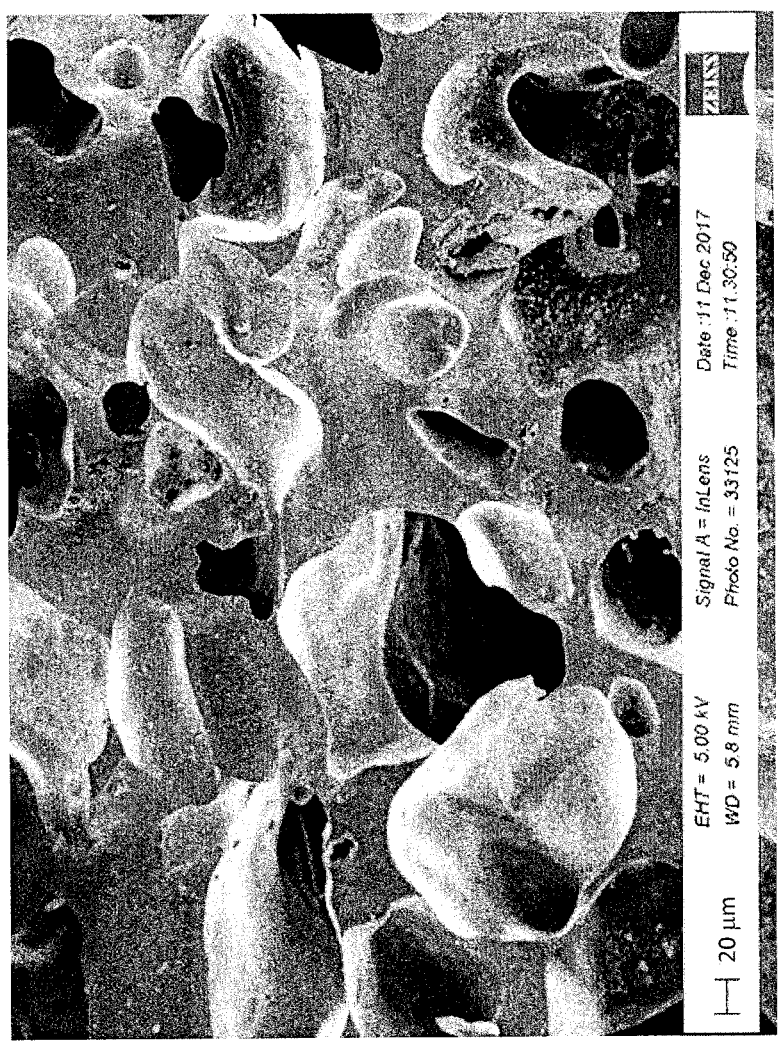
FIGS. 2A and 2B show scanning electron microscope (SEM) images of cross-sections of carbon foams formed according to embodiments of the present methods.
Figure 2B:
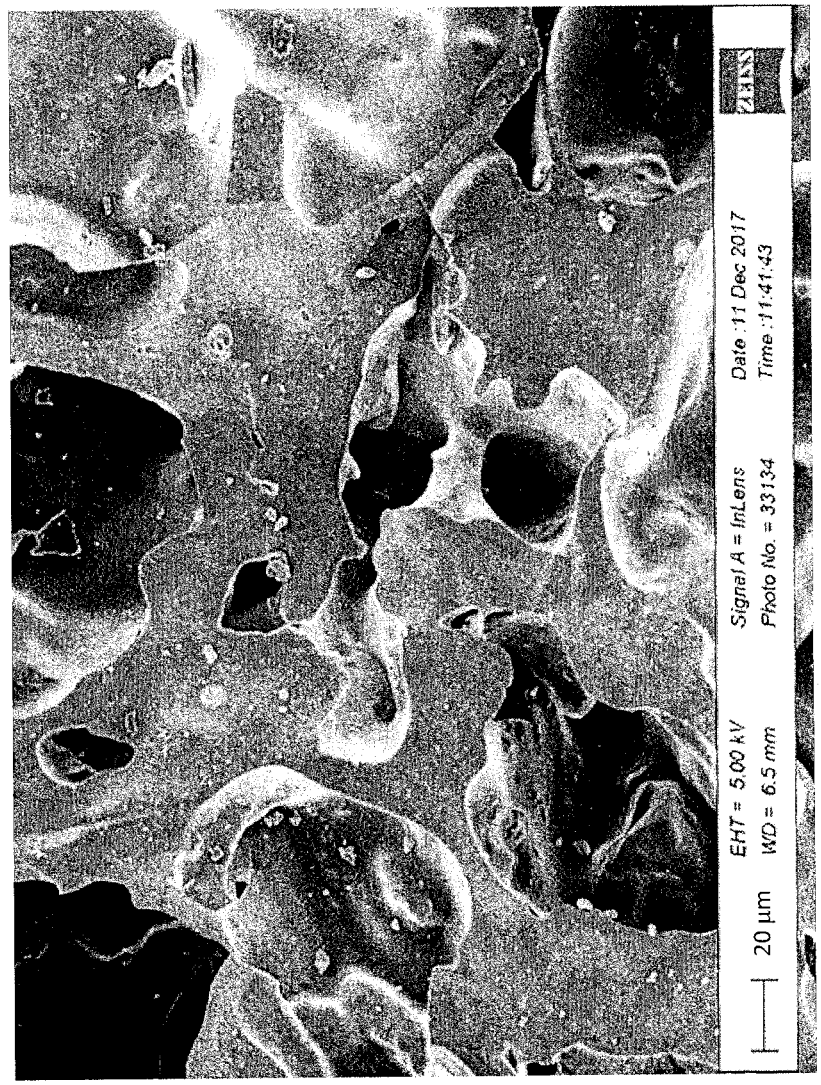

SEM images of cross-sections of a carbon foam prepared according to Example 3 are shown in FIGS. 2A-2B.

All the carbon foams passed the fire resistance test.

Example 4

Example 4 illustrates the effects of the temperature used to at least partially decompose lignin (ingredient B) on the properties of carbon foams. 150 grams of ingredient A10 (dried kraft lignin, moisture 4.2%) and 150 grams of various ingredient Bs were put into a ball mill machine and ground for 30 minutes. The compositions were each deposited in the chamber of the molding assembly 100 of FIG. 1. In this Example, the compositions were hot pressed. The molding assembly 100 was put onto the heating plates of a hydraulic hot press machine and the heating plates were heated at a heating rate of from about 0.1 to 10° C./min up to a temperature of about 150-300° C. and holding for 5 to 30 minutes to let the lignin blend soften. Next, a pressure of between 0 and 50 MPa was applied to the composition for 5-60 seconds. The compositions were then transferred in the chamber to a heating chamber and the upper block 116 was placed over the chamber as shown in FIG. 1. The upper block 116 was used to apply a pressure of from 1 to 10000 Pa on the compositions. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. Carbon foams in the molding assembly 100 were then cooled to room temperature at a rate of less than about 10° C./min. The treatment of Example 4 provides open celled expanded carbon foams. After removal from the molding assembly 100, the carbon foams may be sawed or otherwise shaped by machining to the desired dimension.

Table 2 shows the physical properties of the resulting carbon foams made according to Example 4, using different ingredient Bs. The results show that the apparent density increases as the pretreatment temperature increases. Porosity decreases with increasing pretreatment temperature. The compressive strength also increases with increasing pretreatment temperature.

TABLE 2

Physical properties of carbon foams prepared using ingredient A and ingredient B pretreated with different temperatures.

| Ingredient B | Pretreatment temperature (° C.) | Apparent density (g/cm³) | Porosity (%) | Compressive strength (MPa) |
| --- | --- | --- | --- | --- |
| B1 | 225 | 0.16 | 87.6 | 15.5 |
| B2 | 250 | 0.21 | 84.3 | 20.3 |
| B3 | 275 | 0.26 | 80.9 | 27.1 |
| B4 | 300 | 0.32 | 77.5 | 32.2 |
| B5 | 325 | 0.39 | 72.9 | 36.8 |
| B6 | 350 | 0.46 | 68.5 | 40.2 |
| B7 | 375 | 0.53 | 63.9 | 42.5 |
| B8 | 400 | 0.58 | 60.5 | 44.2 |
| B9 | 425 | 0.63 | 57 | 47.5 |
| B10 | 450 | 0.68 | 53.8 | 50.6 |

Example 5

200 grams of ingredient A10 (dried kraft lignin, moisture 4.2%) and 100 grams of ingredient B8 (kraft lignin, partially decomposed at 400° C.) were put into a ball mill machine and ground for 30 minutes. The compositions were each deposited in the chamber of the molding assembly 100 of FIG. 1. The molding assembly 100 was put onto the heating plates of a hydraulic hot press machine and the heating plates were heated at a heating rate of from about 0.1 to 10° C./min up to a temperature of about 150-300° C. and holding for 5 to 30 minutes to let the lignin blend soften. Next, a pressure of between 0 and 50 MPa was applied to the composition for 5-60 seconds. The compositions were then transferred in the chamber to a closed heating vessel and the upper block 116 was placed over the chamber as shown in FIG. 1. The upper block 116 was used to apply a pressure of from 1 to 10000 Pa on the compositions. Nitrogen or argon gas was first introduced into the closed heating vessel to purge the air. The closed heating vessel was then heated at a heating rate of from about 0.1 to 10° C./min up to a temperature of about 450-700° C. and held for 30 to 60 minutes. The compositions were then then cooled to room temperature at a rate of less than about 10° C./min. The pressure of the closed heating vessel was controlled to below 500 psig and the gas is released at room temperature. Next, the compositions were removed from the chamber of the molding assembly 100 and transferred to a high temperature heating chamber, which was heated at a rate of from about 1 to 20° C./min up to a temperature of about 750-1100° C. under a non-oxidizing atmosphere and held at this temperature to achieve carbonization/graphitization. Carbon foams were then cooled to room temperature at a rate of less than about 10° C./min. The treatment of Example 5 provides open celled expanded carbon foams. The carbon foams may be sawed or otherwise shaped by machining to the desired dimension.

Example 6

280 grams of ingredient B2 (kraft lignin, partially decomposed at 250° C.) and 20 grams of carbon fiber were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 6 provided an open celled expanded carbon foam. After removal from the molding assembly 100, the carbon foam may be sawed or otherwise shaped by machining to the desired dimension. Carbon foam formed according to Example 6 was characterized by an apparent density of about 0.3 g/cm$^3$, a compressive strength of about 60 MPa and a thermal conductivity of about 20 W/m/K at room temperature.

Example 7

200 grams of ingredient A10 (dried kraft lignin, moisture 4.2%), 90 grams of ingredient B3 (kraft lignin, partially decomposed at 275° C.) and 10 grams of carbon nanotube were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 7 provided an open celled expanded carbon foam. After removal from the molding assembly 100, the carbon foam may be sawed or otherwise shaped by machining to the desired dimension. Carbon foam formed according to Example 7 was characterized by an apparent density of about 0.35 g/cm$^3$, a compressive strength of about 55 MPa and a thermal conductivity of about 15 W/m/K at room temperature.

Example 8

180 grams of ingredient A10 (dried kraft lignin, moisture 4.2%), 100 grams of ingredient B3 (kraft lignin, partially decomposed at 275° C.) and 20 grams of ingredient B12 (iron-impregnated graphene-based material from kraft lignin) are put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 8 provided an open celled expanded carbon foam. After removal from the molding assembly 100, the carbon foam may be sawed or otherwise shaped by machining to the desired dimension. Carbon foam formed according to Example 8 was characterized by an apparent density of about 0.55 g/cm$^3$, a compressive strength of about 70 MPa and a thermal conductivity of about 50 W/m/K at room temperature.

Example 9

200 grams of ingredient A3 (lignosulfonates) and 100 grams of ingredient B11 (wood char) were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. The composition was transferred in the chamber to a heating chamber and the upper block 116 was placed over the chamber as shown in FIG. 1. The upper block 116 was used to apply a pressure of from 1 to 10000 Pa on the composition. Nitrogen or argon gas was introduced into the heating chamber. The heating chamber was then heated at a heating rate of from about 0.1 to 10° C./min up to a temperature of about 450-700° C. and held for 30 to 60 minutes. After which, it is cooled slowly. The foam is removed from the mold. The foam was then further graphitized by introducing it into a furnace at a temperature of 1000-3000° C. under a non-oxidizing atmosphere at atmospheric pressure for one hour. After cooling, the now graphitized carbon foam is withdrawn from the furnace. The graphite foam sample is subsequently sawed or otherwise shaped by machining to the desired dimensions. The carbon foam formed according to Example 9 was characterized by an apparent density of about 0.7 g/cm$^3$, a compressive strength of about 50 MPa and a thermal conductivity of about 50 W/m/K at room temperature.

Example 10

200 grams of ingredient A10 (dried kraft lignin, moisture 4.2%) and 100 grams of ingredient C1 (carbon-encapsulated iron nanoparticles from kraft lignin) were ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. The compositions were then transferred in the chamber to a closed heating vessel and the upper block 116 was placed over the chamber as shown in FIG. 1. The upper block 116 was used to apply a pressure of from 1 to 10000 Pa on the compositions. Nitrogen or argon gas was first introduced into the closed heating vessel to purge the air. The closed heating vessel was then heated at a heating rate of from about 0.1 to 10° C./min up to a temperature of about 450-700° C. and held for 30 to 60 minutes. The composition was then then cooled to room temperature at a rate of less than about 10° C./min. The pressure of the closed heating vessel was controlled to below 500 psig and the gas is released at room temperature. Next, the composition was removed from the chamber of the molding assembly 100 and transferred to a high temperature heating chamber, which was heated at a rate of from about 1 to 20° C./min up to a temperature of about 750-1100° C. under a non-oxidizing atmosphere and held at this temperature to achieve carbonization/graphitization. Carbon foam was then cooled to room temperature at a rate of less than about 10° C./min. The treatment of Example 10 provides an open celled expanded carbon foam embedded with carbon-encapsulated iron nanoparticles. The carbon foam may be sawed or otherwise shaped by machining to the desired dimension.

Example 11

150 grams of ingredient B3 (kraft lignin, partially decomposed at 275° C.) and 150 grams of ingredient C2 (carbon-encapsulated cobalt nanoparticles from kraft lignin) were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 11 provided an open celled expanded carbon foam embedded with carbon-encapsulated cobalt nanoparticles. After removal from the molding assembly 100, the carbon foam may be sawed or otherwise shaped by machining to the desired dimension.

Example 12

150 grams of ingredient A10 (dried kraft lignin, moisture 4.2%) and 150 grams of ingredient D1 (carbon-encapsulated tungsten carbide nanoparticles from kraft lignin) were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. The composition was transferred in the chamber to a heating chamber and the upper block 116 was placed over the chamber as shown in FIG. 1. The upper block 116 was used to apply a pressure of from 1 to 10000 Pa on the composition. Nitrogen or argon gas was introduced into the heating chamber. The heating chamber was then heated at a heating rate of from about 0.1 to 10° C./min up to a temperature of about 450-700° C. and held for 30 to 60 minutes. After which, it is cooled slowly. The foam is removed from the mold. The foam was then further graphitized by introducing it into a furnace at a temperature of 1000-3000° C. under a non-oxidizing atmosphere at atmospheric pressure for one hour. After cooling, the now graphitized carbon foam is withdrawn from the furnace. The graphite foam sample is subsequently sawed or otherwise shaped by machining to the desired dimensions. The treatment of Example 12 results in the production of an open celled expanded carbon foam embedded with carbon-encapsulated tungsten carbide nanoparticles. The carbon foam formed according to Example 12 was characterized by an apparent density of about 1.8 g/cm$^3$ and a compressive strength of about 150 MPa.

Example 13

100 grams of ingredient A10 (dried kraft lignin, moisture 4.2%) and 200 grams of ingredient D2 (carbon-encapsulated titanium oxide nanoparticles from kraft lignin) were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. The composition was transferred in the chamber to a heating chamber and the upper block 116 was placed over the chamber as shown in FIG. 1. The upper block 116 was used to apply a pressure of from 1 to 10000 Pa on the composition. Nitrogen or argon gas was introduced into the heating chamber. The heating chamber was then heated at a heating rate of from about 0.1 to 10° C./min up to a temperature of about 450-700° C. and held for 30 to 60 minutes. After which, it is cooled slowly. The foam is removed from the mold. The foam was then further graphitized by introducing it into a furnace at a temperature of 1000-3000° C. under a non-oxidizing atmosphere at atmospheric pressure for one hour. After cooling, the now graphitized carbon foam is withdrawn from the furnace. The graphite foam sample is subsequently sawed or otherwise shaped by machining to the desired dimensions. The treatment of Example 13 results in the production of an open celled expanded carbon foam embedded with carbon-encapsulated titanium oxide nanoparticles. The carbon foam formed according to Example 13 was characterized by an apparent density of about 1.5 g/cm$^3$ and a compressive strength of about 180 MPa.

Example 14

250 grams of ingredient A3 (lignosulfonates) and 50 grams of nano zirconium oxide powder were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. The composition was transferred in the chamber to a heating chamber and the upper block 116 was placed over the chamber as shown in FIG. 1. The upper block 116 was used to apply a pressure of from 1 to 10000 Pa on the composition. Nitrogen or argon gas was introduced into the heating chamber. The heating chamber was then heated at a heating rate of from about 0.1 to 10° C./min up to a temperature of about 450-700° C. and held for 30 to 60 minutes. After which, it is cooled slowly. The foam is removed from the mold. The foam was then further graphitized by introducing it into a furnace at a temperature of 1000-3000° C. under a non-oxidizing atmospheric pressure for one hour. After cooling, the now graphitized carbon foam is withdrawn from the furnace. The graphite foam sample is subsequently sawed or otherwise shaped by machining to the desired dimensions. The treatment of Example 14 results in the production of an open celled expanded carbon foam embedded with zirconium oxide nanoparticles. The carbon foam formed according to Example 14 was characterized by an apparent density of about 2.0 g/cm$^3$ and a compressive strength of about 200 MPa.

Example 15

200 grams of ingredient B2 (kraft lignin, partially decomposed at 250° C.) and 100 grams of nano aluminum oxide powder were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. The composition was transferred in the chamber to a heating chamber and the upper block 116 was placed over the chamber as shown in FIG. 1. The upper block 116 was used to apply a pressure of from 1 to 10000 Pa on the composition. Nitrogen or argon gas was introduced into the heating chamber. The heating chamber was then heated at a heating rate of from about 0.1 to 10° C./min up to a temperature of about 450-700° C. and held for 30 to 60 minutes. After which, it is cooled slowly. The foam is removed from the mold. The foam was then further graphitized by introducing it into a furnace at a temperature of 1000-3000° C. under a non-oxidizing atmosphere at atmospheric pressure for one hour. After cooling, the now graphitized carbon foam is withdrawn from the furnace. The graphite foam sample is subsequently sawed or otherwise shaped by machining to the desired dimensions. The treatment of Example 15 results in the production of an open celled expanded carbon foam embedded with aluminum oxide nanoparticles.

Example 16

150 grams of ingredient A10 (dried kraft lignin, moisture 4.2%), 50 grams of ingredient B2 (kraft lignin, partially decomposed at 250° C.) and 100 grams of ingredient C2 (carbon-encapsulated cobalt nanoparticles from kraft lignin) were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 16 provided an open celled expanded carbon foam embedded with carbon-encapsulated cobalt nanoparticles. After removal from the molding assembly 100, the carbon foam may be sawed or otherwise shaped by machining to the desired dimension.

Example 17

200 grams of ingredient A10 (dried kraft lignin, moisture 4.2%), 80 grams of ingredient B11 (wood char) and 10 grams of metal iron powder were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 17 provided an open celled expanded carbon foam embedded with iron nanoparticles. After removal from the molding assembly 100, the carbon foam may be sawed or otherwise shaped by machining to the desired dimension.

Example 18

200 grams of ingredient B2 (kraft lignin, partially decomposed at 250° C.), 70 grams of ingredient C2 (carbon-encapsulated cobalt nanoparticles from kraft lignin) and 30 grams of nano cobalt oxide powder were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. The treatment of Example 18 provided an open celled expanded carbon foam embedded with carbon-encapsulated cobalt nanoparticles. After removal from the molding assembly 100, the carbon foam may be sawed or otherwise shaped by machining to the desired dimension.

Example 19

200 grams of ingredient B4 (kraft lignin, partially decomposed at 300° C.), was put into a ball mill machine, and ground for 20 minutes, then the fine powder was added to ingredient A11 (raw black liquor from kraft pulp mills, which contains about 100 grams of kraft lignin), and the mixture was stirred for 1 hours. The final mixture was vaporized and dried at 110° C. in an oven for 24 h, the dried solid was ground in a ball mill machine with 1000 rpm for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min.

Example 20

150 grams of ingredient B5 (kraft lignin, partially decomposed at 325° C.), was put into a ball mill machine, and ground for 20 minutes, then the fine powder was added to ingredient A12 (concentrated black liquor from kraft pulp mills, which contains about 150 grams of kraft lignin), and the mixture was stirred for 1 hours. The final mixture was vaporized and dried at 110° C. in an oven for 24 h, the dried solid was ground in a ball mill machine with 1000 rpm for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min.

Example 21

100 grams of ingredient B6 (kraft lignin, partially decomposed at 350° C.), was put into a ball mill, and ground for 20 minutes, then the fine powder was added to ingredient A13 (purified black liquor from kraft pulp mills, which contains about 200 grams of kraft lignin), and the mixture was stirred for 1 hours. The final mixture was vaporized and dried at 110° C. in an oven for 24 h, the dried solid was ground in a ball mill machine with 1000 rpm for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. After removal from the molding assembly 100, the carbon foam may be sawed or otherwise shaped by machining to the desired dimension. Examples 19-21 illustrate use of the method to produce carbon foams using the black liquors from different lignin recovery steps.

Example 22

150 grams of ingredient B4 (kraft lignin, partially decomposed at 300° C.), and 150 grams of ingredient A14, or A15 or A16 (solid residues from the raw black liquor, ingredient A11, or the concentrated black liquor, ingredient A12, or the purified black liquor, ingredient A13) were put into a ball mill machine and ground for 30 minutes. The composition was deposited in the chamber of the molding assembly 100 of FIG. 1. The composition in the chamber was cold pressed using a pressure of between 0 and 50 MPa for a time of between 5-60 seconds. Then, the composition was transferred in the chamber to a heating chamber and the upper block 116 was placed over the chamber as shown in FIG. 1. The upper block 116 was used to apply a pressure of from 1 to 10000 Pa on the composition during heating. Nitrogen or argon gas was introduced into the heating chamber. The heating chamber was then heated at a heating rate of from about 0.1 to 10° C./min up to a temperature of about 450-700° C. and held for 30 to 60 minutes. Next, the heating chamber was further heated at a heating rate of from about 1 to 20° C./min up to a temperature of about 750-1100° C. and held at this temperature to achieve carbonization/graphitization. The carbon foam in the molding assembly 100 was then cooled to room temperature at a rate of less than about 10° C./min. After removal from the molding assembly 100, the carbon foam may be sawed or otherwise shaped by machining to the desired dimension. Example 22 illustrates use of the method to produce carbon foams using the black liquor residues from different lignin recovery steps.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the present disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of making a carbon foam, the method comprising:
   (a) subjecting a precursor composition comprising an amount of at least partially decomposed lignin to a first pressure for a first time, optionally, while heating the precursor composition to a first temperature, thereby providing a compressed precursor composition;
   (b) heating the compressed precursor composition to a second, higher temperature for a second period of time while subjecting the compressed precursor composition to a second pressure to further decompose the at least partially decomposed lignin and to generate pores within the compressed precursor composition, thereby providing a porous, decomposed precursor composition; and
   (c) heating the porous, decomposed precursor composition to a third temperature for a third time to carbonize, and optionally, to graphitize, the porous, decomposed precursor composition to provide the carbon foam, wherein the precursor composition comprises kraft lignin or black liquor.

2. The method of claim 1, wherein the precursor composition further comprises an amount of raw lignin.

3. The method of claim 1, wherein the at least partially decomposed lignin comprises carbon-encapsulated metal nanoparticles, graphene-encapsulated metal nanoparticles, a graphene-based material, or combinations thereof.

4. The method of claim 1, wherein the precursor composition further comprises one or more additives selected from carbon particles, carbon nanoparticles, metal, metal oxide, metal carbide, and combinations thereof.

5. The method of claim 2, wherein the precursor composition has a ratio of raw lignin to at least partially decomposed lignin, the ratio selected to provide the carbon foam with a predetermined compressive strength.

6. The method of claim 2, wherein the precursor composition has a ratio of raw lignin to at least partially decomposed lignin in the range of from about 5:1 to about 1:5 based on weight of the raw lignin and weight of the at least partially decomposed lignin.

7. The method of claim 1, wherein the first pressure is in the range of from greater than 0 MPa to about 50 MPa.

8. The method of claim 1, wherein step (a) is a cold press step and the first time is in the range of from about 5 sec to about 60 sec.

9. The method of claim 1, wherein step (a) is a hot press step and the first temperature is at least as high as a softening temperature ($T_s$) of the lignin in the precursor composition.

10. The method of claim 9, wherein the first temperature is in the range of from about 150° C. to about 300° C.

11. The method of claim 9, wherein the first time is in the range of from about 5 min to about 30 min.

12. The method of claim 1, wherein the second temperature is at least as high as a decomposition temperature ($T_d$) of the lignin in the precursor composition.

13. The method of claim 12, wherein the second temperature is in the range of from about 450° C. to about 700° C.

14. The method of claim 1, wherein the second time is in the range of from about 30 min to about 60 min.

15. The method of claim 1, wherein the second pressure is in the range of from about 1 Pa to about 10,000 Pa.

16. A method of making a carbon foam, the method comprising:
   (a) subjecting a precursor composition comprising an amount of at least partially decomposed lignin to a first pressure for a first time, optionally, while heating the precursor composition to a first temperature, thereby providing a compressed precursor composition;
   (b) heating the compressed precursor composition to a second, higher temperature for a second period of time while subjecting the compressed precursor composition to a second pressure to further decompose the at least partially decomposed lignin and to generate pores within the compressed precursor composition, thereby providing a porous, decomposed precursor composition; and
   (c) heating the porous, decomposed precursor composition to a third temperature for a third time to carbonize, and optionally, to graphitize, the porous, decomposed precursor composition to provide the carbon foam, wherein the at least partially decomposed lignin has been formed by heating raw lignin to an elevated temperature and for a time to at least partially decompose the raw lignin.

17. The method of claim 16, further comprising forming the at least partially decomposed lignin.

18. The method of claim 16, wherein the at least partially decomposed lignin has been formed by heating the raw lignin to the elevated temperature in a range of from about 200° C. to about 500° C. under an inert atmosphere and for the time of from about 0.5 hour to about 5 hours to at least partially decompose the raw lignin.

19. A method of making a carbon foam, the method comprising:
   (a) subjecting a precursor composition comprising an amount of at least partially decomposed lignin to a first pressure for a first time, optionally, while heating the precursor composition to a first temperature, thereby providing a compressed precursor composition;
   (b) heating the compressed precursor composition to a second, higher temperature for a second period of time while subjecting the compressed precursor composition to a second pressure to further decompose the at least partially decomposed lignin and to generate pores within the compressed precursor composition, thereby providing a porous, decomposed precursor composition; and
   (c) heating the porous, decomposed precursor composition to a third temperature for a third time to carbonize, and optionally, to graphitize, the porous, decomposed precursor composition to provide the carbon foam, wherein the carbon foam is characterized by a compressive strength of at least about 20 MPa.

20. The method of claim 19, wherein the carbon foam is characterized by a compressive strength of at least about 45 MPa.

* * * * *